United States Patent [19]

Bastille et al.

[11] Patent Number: 5,209,505
[45] Date of Patent: May 11, 1993

[54] SNOWMOBILE SKI LIFT CARRIAGE

[76] Inventors: Romain Bastille, 2, rue Mère Anthier, Rivière-du-Loup, Québec, Canada, G5R 3W9; Adélard Vaillancourt, 324, Boulevard Thériault, Rivière-du-Loup, Quebec, Canada, G5R 3X8

[21] Appl. No.: 855,912
[22] Filed: Mar. 23, 1992
[51] Int. Cl.⁵ ............................................. B62B 3/02
[52] U.S. Cl. ..................................... 280/8; 280/79.11
[58] Field of Search .................... 280/8, 7.14, 47.131, 280/63, 79.11, 7.12; 180/182

[56] References Cited

U.S. PATENT DOCUMENTS

| | | | |
|---|---|---|---|
| 605,162 | 6/1898 | Deane | 280/8 |
| 627,001 | 6/1899 | Lahm | 280/8 |
| 1,123,676 | 1/1915 | Bule | 280/8 |
| 1,947,154 | 2/1934 | Fox | 280/8 |
| 3,437,354 | 4/1969 | Hetteeen | 280/408 |
| 3,570,617 | 3/1971 | O'Day | 280/8 |
| 3,777,829 | 12/1973 | Rogers | 280/8 |
| 4,288,087 | 9/1981 | Morrison | 280/47.32 |
| 4,288,087 | 9/1981 | Morrison | 280/47.32 |

FOREIGN PATENT DOCUMENTS

| | | | |
|---|---|---|---|
| 873771 | 6/1971 | Canada . | |
| 78569 | 5/1951 | Norway | 280/8 |

*Primary Examiner*—Margaret A. Focarino
*Assistant Examiner*—Michael Mar
*Attorney, Agent, or Firm*—Pierre Lespérance; Francois Martineau

[57] ABSTRACT

A pair of lift carriages for supporting spacedly over ground, in a removable fashion, the front guiding skis of a snowmobile. Each carriage includes a frame, movably mounted over ground by tires, and a lever arm pivoted to the frame about an axis parallel to the rolling direction of the tires. The frame and the lever arm comprise hooks, to grasp and fixedly secure the ski when the lever arm is manually operated in an opertive position. The length of the hook is adjustable, so as to adapt itself to snowmobile skis of various widths. A look releasably locks the lever arm in its operative position.

7 Claims, 3 Drawing Sheets

SNOWMOBILE SKI LIFT CARRIAGE

FIELD OF THE INVENTION

The invention relates to snowmobile components, particularly to movable lift carriages for the front skis of snowmobiles.

BACKGROUND OF THE INVENTION

Snowmobiles are known to run on specific snow-covered circuits adapted for exclusive snowmobile circulation. These circuits are sometimes quite elongated, extending in some instances for hundreds of miles. Therefore, these snowmobile circuits must cross public roads once and a while, which are usually made up of gravel or asphalt such abrasive surfaces of the public roads do not bode well for the snowmobiles, whose structure, particularly the front guiding skis, will quickly become worn out when the snowmobiles run frequently thereover.

The state of the art reveals a few patents describing trolleys for lifting above ground a snowmobile when running over public roads. The reader will profitably look at the following references:
  (a) U.S. Pat. No. 3,437,354 issued in April 1969 to Edgar Hetteen;
  (b) U.S. Pat. No. 3,570,617 issued in March 1971 to Ski Wheels, inc.;
  (c) CAN 873,771 issued in June 1971 to Yamaha motor, a Japanese corporation;
  (d) U.S. Pat. No. 3,777,829 issued in December 1973 to the Johnson Stamping and Fine Blanking corporation;
  (e) U.S. Pat. No. 4,288,087 issued in September 1981 to MPD Enterprises of Delavan, inc.

The above-noted Patents generally describe carriages which may be mounted beneath the front skis of a snowmobile, to rollingly displace the skis over a road. However, a disadvantage of these Patents is that the carriage mounting to the skis does require tools, and does take a substantial time for completing the installation.

That is, to the exception of the U.S. Pat. No. 3,777,829, since various embodiments of carriages are envisioned in FIGS. 2, 3 and 4, which may be easily and quickly mounted, manually, as suggested in FIGS. 7 and 8 of the Patent. More particularly, carriage 38 is mounted beneath the ski 20, bearing on its main body 40, and the ski is frictionally secured thereto between the lateral ears 44 and 68 of the carriage (FIG. 2). A disadvantage of such an installation is the relatively high likelihood of accidental disengagement of the carriage from the ski, Particularly in a curb, since there is no means provided for locking to the ski in operative position, other than the ears 68 and 44 which only in fact hook to the lateral edges of the ski.

OBJECTS OF THE INVENTION

The gist of the invention is to extend the useful lifetime of the front guiding skis of a snowmobile, by providing means to adequately shield them during abrasive-born public road crossings, particularly when taking a curb.

An important goal of the invention is to provide a movable lift carriage for the front skis of a snowmobile, which may be fixedly and continuously mounted thereto in a sturdy fashion, while remaining easily and manually removable without recourse to any tool.

Another object of the invention is to Provide such a movable lift carriage for the front skis of a snowmobile, which may adapt to front skis of snowmobiles of different makes or having various widths.

An object of the invention is that the above-noted lift carriage, when not in use, be easily carried over ground by the snowmobile itself.

SUMMARY OF THE INVENTION

In accordance with the teachings of the invention, there is disclosed a lift carriage destined to movably support over ground a front ski of a snowmobile, the ski consisting of a main elongated body defining first and a second, opposite lengthwise edges, the carriage comprising: (a) a rigid frame, defining an upper surface destined to releasably support the load of said ski main body; (b) rolling means, carried by said frame to freely displace the latter rollingly about a Plane generally parallel to said frame upper surface; (c) a lever member, Pivoted to said frame about an axis generally Parallel to the rolling direction of said rolling means, the lever member adapted to Pivot between an inoperative position and an operative position and comprising a stopper destined to interact with said first lengthwise edge of the ski in the operative Position of said lever member; and (d) hook means, destined to releasably anchor said second lengthwise ski edge to said frame; wherein actuation of said lever member in its operative position biasing said stopper to engage said first lengthwise ski edge, thus also engaging said hook means, so as to grasp said ski and to anchor the latter to said carriage frame.

Alternately, the invention concerns a wheel mounted lift carriage for rollingly supporting the front Portion of a snowmobile on a planar surface, said front Portion having guiding skis, said carriage comprising: (a) a hook member, having an upper planar surface, to support the load of a ski, and edge members on a lateral side of said hook member, said edge members destined to be releasably mounted to a corresponding, first, lengthwise side edge of the ski, said edge members defining curved ears destined to be frictionally engaged by the lateral side edges of the ski; (b) lever means, comprising a lever member installed to said hook member so as to be able to translate thereabout and to be able to engage said upper, Planar surface, and a stopper member fixedly secured to said hook member and destined to support the load of the second side edge of the ski; and (c) a rolling device, mounted to said hook member to enable rolling motion of said hook member on a planar surface; wherein said lever means are actuated manually to bias said lever member to an operative Position such that said lever member and said edge members are biased to cooperate with said ski, wedgingly against said stopper member, to releasably secure said lift carriage to said ski.

DETAILED DESCRIPTION OF THE INVENTION

Figure 1:
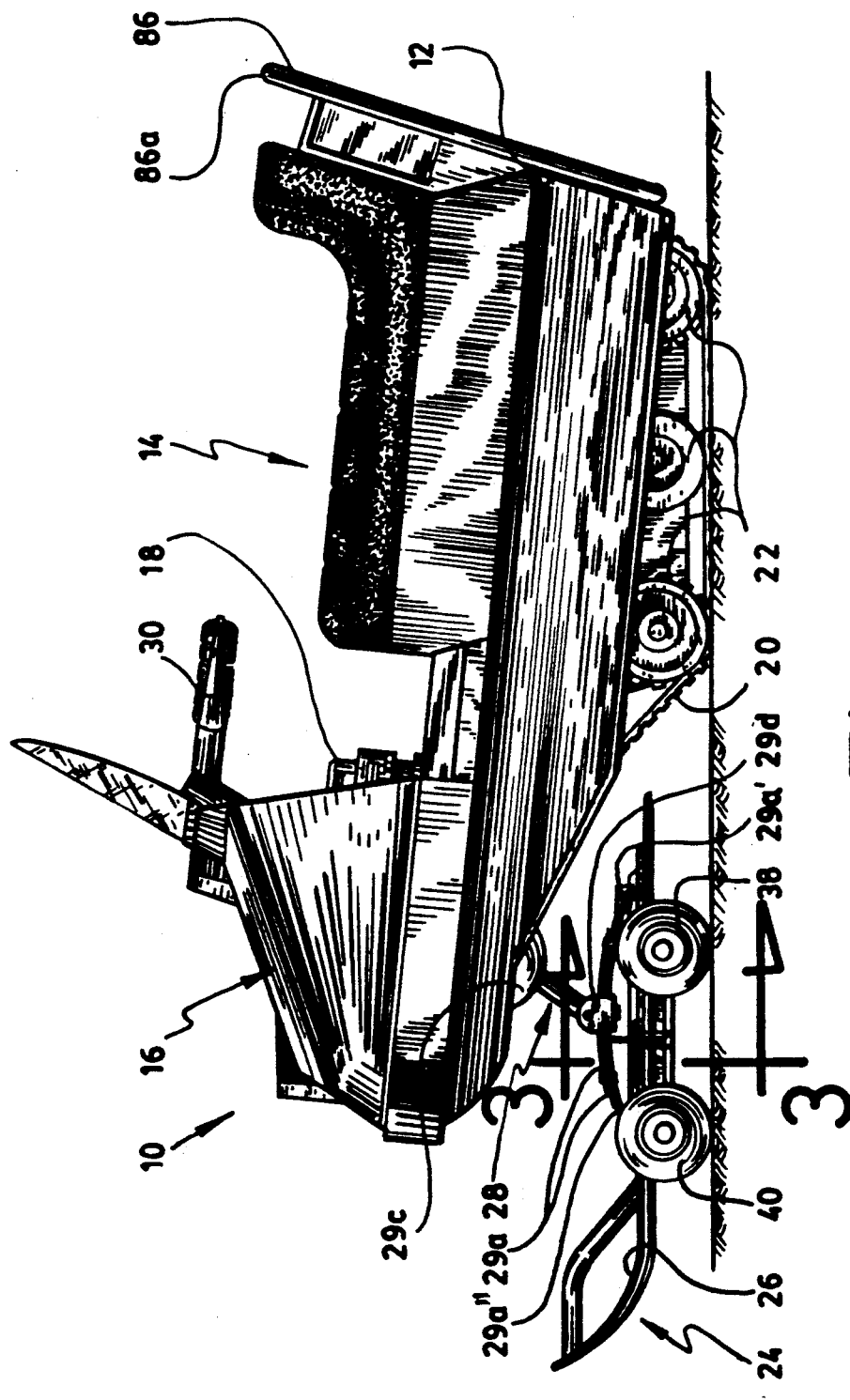
FIG. 1 is a side elevation of a snowmobile, with the front guiding skates thereof movably supported over ground by a wheel carriage accordingly with the teachings of the invention.

Snowmobile 10 conventionally comprises a frame 12 supporting an aft cockpit 14 and a front fairing 16 shielding an engine block 18. An endless belt 20 is translated by the engine block 18 to rotate toothed wheels 22, the latter rotatively mounted beneath the cockpit 14. A Pair of laterally spaced skates 24, support above ground the front fairing 16, thanks to a suspension 28. Each skate 24 consists of a wide ski 26 (or narrow ski 26'), spacedly secured to the frame 12 by the suspension 28. Suspension 28 comprises a series of metallic spring blades 29a, superimposed to one another and anchored at their ends 29a', 29a" in two lengthwisely spaced positions of the ski 26. A shaft 29b links the front of chassis 12 to the spring blades 29a, thanks to known pivot members 29c and 29d respectively.

Shaft 29b is rotatively controlled by a handle 30 at the front of cockpit 14, biasing the ski 26 to pivot about pivot axle 29b, the latter being substantially transverse to the lengthwise axis of the snowmobile 10.

Figure 3:
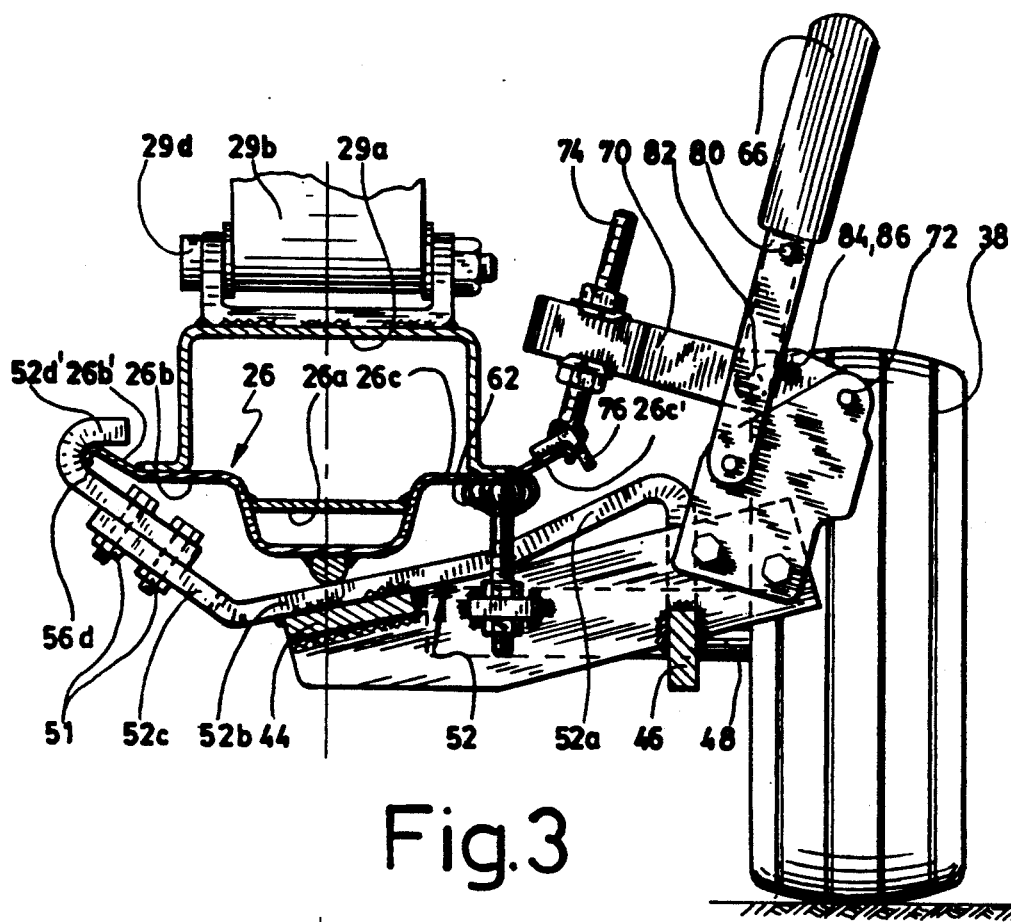
FIGS. 3–3a each shows an enlarged sectional view of the carriage and the ski, taken along line 3—3 of FIG. 1, enabling one to understand how the snowmobile ski carriage may be adapted to skis of various widths.

Ski 26 or 2' conventionally consists of a thick, main body 26a having two thin, lengthwise edges 26b and 26c being upwardly offset relative to the bight of the main body 26a, as well shown at FIG. 3 (pr 3a). Each edge 26b, 26c comprises an upwardly inclined rounded rim, at 26b', 26c'. The main body 26a usually carries at its lower face a length wise lower ridge 27.

Figure 2:
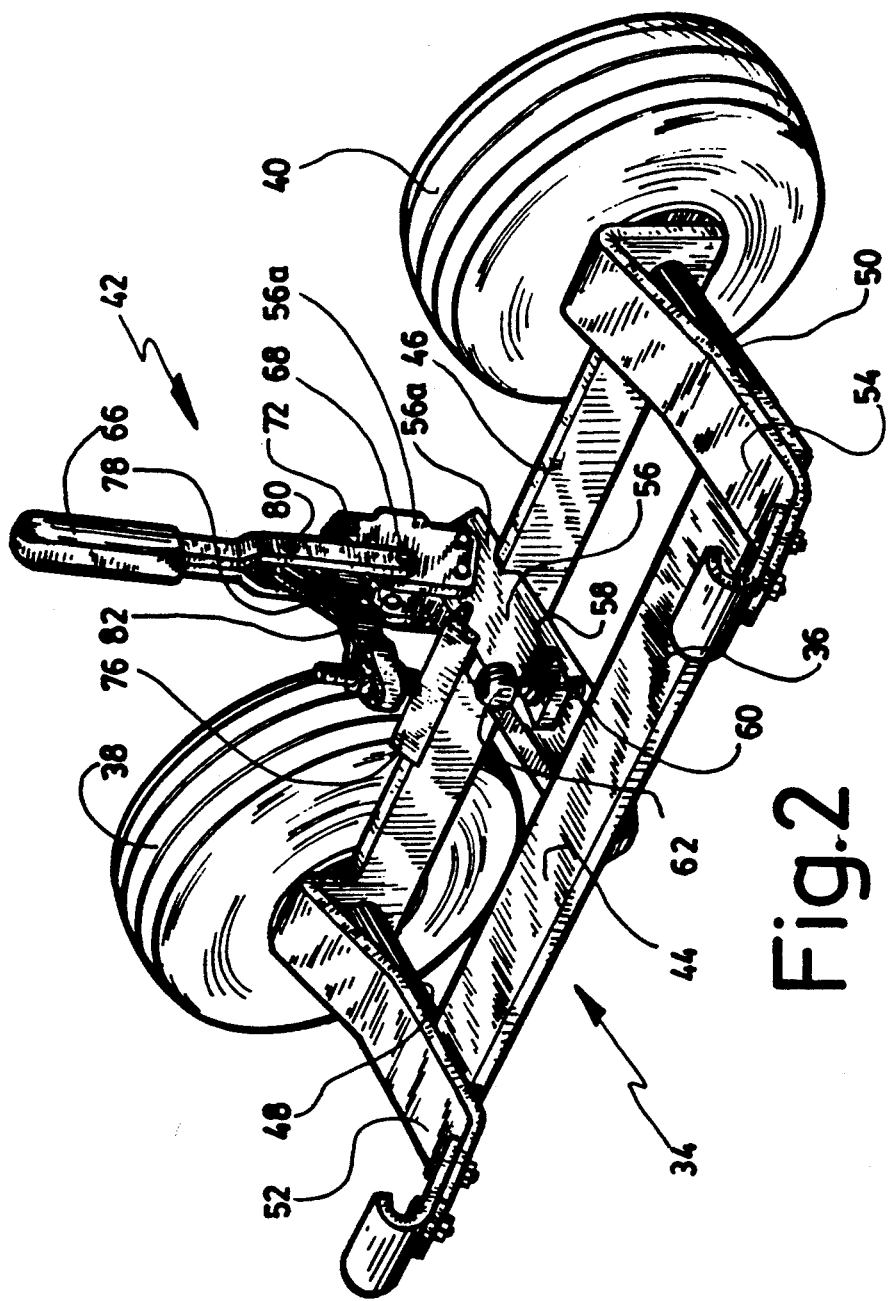
FIG. 2 is an enlarged perspective view of the carriage.

According to the invention, there is provided a lift carriage 34, adapted to fit beneath each skate 24 so as to lift all the front part of the snowmobile 10 including the engine block 18 and the front fairing 16. Each carriage 34, as shown in FIG. 2, consist of a rigid frame 36, spacedly carried over ground by two wheels 38 and 40. A clamp 42, detailed later, is anchored to the frame 36 to render carriage temporarily integral to the skate 26.

More particularly, frame 36 consists of two rectangular bars 44 and 46, held parallel to one another and pivoted at right angle to one another thanks to cylindrical stems 48 and 50 interconnecting the ends of the bars. Stems 48 and 50 extends through bar 46 to axially journal wheels 38 and 40 respectively. Bars 44 and 46 then extend within a horizontal plane and the wheels 38 and 40, within a common vertical plane. The width of bar 44 will then extend with a plane being inclined outwardly and slightly upwardly from the wheels 38 and 40, and the width of the bar 46 will then be vertically extending (FIG. 3).

Figure 3A:
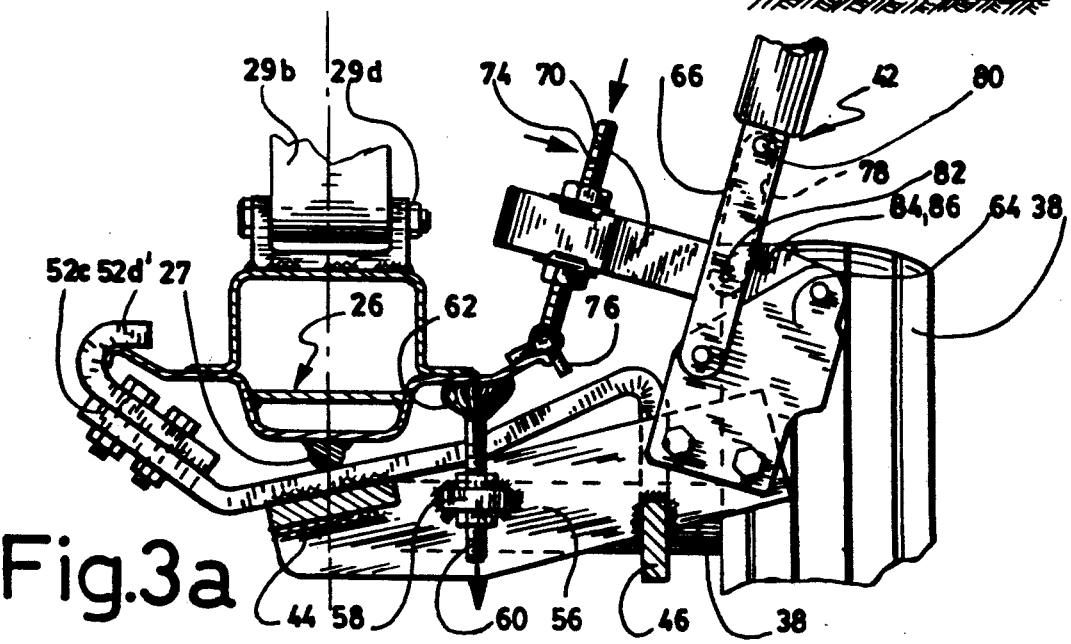

From each of the two opposite ends of elongated bars 46 transversely project a blade 52, 54 respectively, overlying stems 48 and 50 respectively. Blades 52 and 54 form an integral part of the bar 46, and, as is well shown in FIGS. 3 and 3a, each blade comprises a first offset Portion, e.g. 52a at FIG. 3 or 3a, adapted to bring the blade on a straight section which comes to flatly abut against the top of the inclined bar 44, at 52b, and also a second offset Portion 52c, being upwardly inclined from the opposite side beneath the wheels 38 and 40. To the end of section 52c is hooked a rounded hook 52d, having a free end section extending within a substantially horizontal plane 52d'. Bolts 51 anchored to leg 52c are slidingly mounted inside a lengthwise slit of hook 52d, to enable a lengthwise adjustment of the hook 52d on the strip 52d. Hence, as suggested by the sequence of FIGS. 3 and 3a, the total length of the strip 52 inclusive of the extensible extension 52d, is adjustable to adapt to narrower skis (FIG. 3) or to wider skis (FIG. 3a).

Thereafter, by tightening bolts 51, the total length of the hook strip 52 with its extension 52d becomes fixed, for a given ski width.

An iron bar 56 links the top of bar 46 to the bottom of bar 44 transversely thereof, intermediately between blades 52 and 54. A small plate 58 laterally depends from the iron bar 56 intermediately between the bars 44 and 46, said small plate supporting a vertical stem 60 carrying an upper, spherical or elliptical ball 62. This ball 62 projects above the plane of portion 52b, 54b of blades 52, 54.

Iron angle 56 also supports at its external end, between the two wheels 38 and 40, a clamp 42. Clamp 42 comprises a main casing 64, anchored to the free exterior end 56a of the iron bar 56, and a manual control lever 66 is pivotally mounted at 68 to the casing about a pivotal axis substantially parallel to the bars 44 and 46. Lever 66 is hollow, whereby a stem 70 may extend therethrough to be pivoted at its end external to the casing 64, about a second Pivotal axis 72 Parallel to the first axis 68 and upwardly outwardly offset relative thereto. Stem 70 carries a bolt 74 at its internal free end, whose lower head carries a short iron bar 76 extending Parallel to the Pivotal axes 68 and 72. Moreover, a tie-rod 78 links the two levers 66 and 70 about additional pivotal axes 80 and 82 respectively, positioned at a position lengthwisely intermediate of the levers 66 and 70 about Pivotal axes parallel to the first pivotal axes 68 and 72.

Hence, as suggested in FIGS. 3 or 3a, in the operative position of the carriage 34:

(a) Portions 52b, 54b of the bars 52, 54 are adapted to flatly support the bight 26a of the skate 24, by its lower lengthwise ridge 27.

(b) the ball 62 of the carriage flatly supports the external edge 26c of the ski 26.

(c) the inclined rim 26b' of the internal edge 26b of the ski 26 is freely engaged into the rounded cavities formed by the C-shaped tips 52d, 54d of the transverse bars 52, 54 of the carriage; and (d) the control handle 66 is actuated from an outwardly directed disengaged position, to pivot toward the guiding arm 29b of the snowmobile in an operative position in which the small iron angle 76 will be downwardly displaced to come to abut against the inclined rim 26c' of the external edge 26c of the ski.

An additional bias applied onto the handle 66 to pivot same toward shaft 29b will induce a torque on the ski, which will pivot about ball 62 to upwardly bias the inclined rim 26b' of the internal edge of the ski, so as to fictionally lock against the free upper edges 52d', 54d' of the transverse bars 52, 54. Handle 66 may then be grasped and locked in operative position, simply by engaging a lock bolt 84 through a through-bore 86 extending through the stem 70 on the external side of the handle 66 but adjacent thereto, as illustrated in FIG. 3. Hence, the thus locked handle 66 will laterally abut against the head and the opposite free end of this bolt 84, so as to Provide a continuous bias directed downwardly of the iron angle 76 and applied onto the external rim 26c' of the ski, to concurrently bias upwardly, under leverage movement bearing on the ball 62, the internal rim of the ski 26b', against the upper rounded edges 52d', 54d' of the carriage bars 52 and 54.

To release the carriage 34 from the ski 26, one needs only to pull out the lock bolt pin 84, to draw the handle 66 toward the exterior, and to pull out all the carriage laterally outwardly, by hand. No tool is required, either for installation or for releasing the carriage. A single Person is able to install the carriages, one at a time. Installation is a matter of minutes.

Carriages 34 may be carried in inoperative (storage) condition by hooking same to the upper horizontal section of the aft tube of the chassis 86, at 86a, completely to the rear of the vehicle 10, by hooking thereon the edge 52d'. The thus hung carriages may then freely hang to the rear of the vehicle 10.

Trolley 34 will be made from a sturdy material, resistant to cold temperatures and to humidity, for example a suitably rigid plastic material or stainless steel, but for the tires 38-40 which will be made from the known inflatable elastomeric material to enable smooth rolling motion on asphalt or gravel-based surfaces.

Use of the two carriages 34 will Prolong the useful lifetime of the skis 26, when operatively mounted to the snowmobile during crossings on asphalt or gravel-based Public roads, or When the snowmobile rollingly engages into a concrete-based or the like garage.

We claim:

1. A lift carriage adapted to movably support over ground a front ski of a snowmobile, the ski consisting of a main elongated body, first and second ski portions adjacent and on each side of said main elongated body and which are upwardly offset relative to said main body, and first and second opposite lengthwise ski edges bordering said first and second ski portion, respectively, the carriage comprising:
   a) a rigid frame, defining a frame upper surface on which said ski main body is adapted to rest;
   b) rolling means carried by said frame to freely displace the latter over ground;
   c) an abutment member secured to said frame and projecting above said frame upper surface and adapted to engage and support said first ski portion;
   d) a lever member, pivoted to said frame about an axis generally parallel to the rolling direction of said rolling means, the lever member pivotable between an inoperative position and an operative position, and carrying a stopper adjacent and above said abutment member, and adapted to engage from above said first ski and in operative position of said level member; and
   e) hook means carried by said frame to releasably anchor said second ski edge to said frame; whereby actuation of said lever member to its operative position causes said stopper to engage said first ski edge and wedge said first ski portion against said abutment member.

2. A lift carriage as defined in claim 1, further comprising lock means, to releasably lock said lever member 3. A lift carrier as defined in claim 1, wherein said hook means consists of a rounded flange formed at the end of at lest one elongated, rigid blade secured to said frame and transverse to said rolling direction, said rounded flange defining a cavity adapted to be engaged by said second ski edge.

4. A lift carriage as defined in claim 3, further including adjustment means to adjust the position of said rigid blade, laterally of said frame so as to be able to displace said rounded flange accordingly with various width of skis.

5. A lift carriage as defined in claim 1, wherein said rolling means are tires mounted on wheels journalled to said lift carriage frame and extending within a common vertical plane.

6. A lift carriage as defined in claim 1, wherein said stopper is carried at one end of a stem, the stem pivoted at its opposite end to said frame about an upwardly offset axis relative to the pivotal axis of said lever member, and freely extending through said lever member, and further comprising a tie-rod pivotally interconnecting intermediate portions of said stem and of said lever member.

7. A lift carriage as defined in claim 6, wherein said stopper is an iron bar defining a lower cavity adaptin to engage said first lengthwise ski edge.

* * * * *